United States Patent
Oh et al.

(10) Patent No.: US 8,183,301 B2
(45) Date of Patent: May 22, 2012

(54) PREPARATION METHODS FOR LIQUID HYDROCARBONS BY FISCHER-TROPSCH SYNTHESIS THROUGH SLURRY REACTION

(75) Inventors: Jong Hyeok Oh, Daejeon (KR); Jong Wook Bae, Daejeon (KR); Sun Ju Park, Daejeon (KR); Yun Jo Lee, Daejeon (KR); Ki won Jun, Daejeon (KR)

(73) Assignees: Korea Research Institute of Chemical Technology, Daejeon (KR); Daelim Industrial Co., Ltd., Seoul (KR); Korea Gas Corporation, Gyeonggi-do (KR); Korea National Oil Corporation, Gyeonggi-do (KR); Hyundai Engineering Co., Ltd., Seoul (KR); SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/121,111

(22) PCT Filed: Aug. 28, 2009

(86) PCT No.: PCT/KR2009/004851
§ 371 (c)(1),
(2), (4) Date: Mar. 25, 2011

(87) PCT Pub. No.: WO2010/035961
PCT Pub. Date: Apr. 1, 2010

(65) Prior Publication Data
US 2011/0178186 A1    Jul. 21, 2011

(30) Foreign Application Priority Data
Sep. 25, 2008  (KR) .................. 10-2008-0094225

(51) Int. Cl.
*C07C 27/00* (2006.01)
(52) U.S. Cl. ..................................... 518/700
(58) Field of Classification Search .................. 518/700
See application file for complete search history.

(56) References Cited

U.S. PATENT DOCUMENTS

| 4,393,255 A | 7/1983 | Mitchell et al. |
| 6,284,806 B1 | 9/2001 | Chakrabarty et al. |
| 6,677,388 B2 | 1/2004 | Chakrabarty et al. |
| 2005/0107479 A1 | 5/2005 | Espinoza et al. |

FOREIGN PATENT DOCUMENTS

CN    101224425 A    7/2008

OTHER PUBLICATIONS

Iglesia, Enrique: "Design, synthesis, and use of cobalt-based Fischer-Tropsch synthesis catalysts", *Applied Catalysis A: General*, 161 (1997), pp. 59-78.
Zhang, Yi et al.: "Multi-functional alumina-silica bimodal pore catalyst and its application for Fischer-Tropsch synthesis", *Applied Catalysis A: General*, 292 (2005), pp. 252-258.
Jalama, Kalala et al.: "Fischer-Tropsch synthesis over Co/TiO$_2$: Effect of ethanol addition", *Fuel*, 86 (2007), pp. 73-80.
Fujimoto, Kaoru et al.: 'New controlling method for product distribution in Fischer-Tropsch synthesis reaction', *Topics in Catalysis* 2 (1995), pp. 259-266.

*Primary Examiner* — Jafar Parsa
(74) *Attorney, Agent, or Firm* — Frommer Lawrence & Haug LLP; Ronald R Santucci

(57) ABSTRACT

The present invention relates to a method for preparing liquid hydrocarbons via a slurry phase Fischer-Tropsch (F-T) synthesis. In particular, the present invention relates to a method for preparing liquid hydrocarbons from syngas via slurry phase F-T synthesis using a catalyst, which can prevent the decrease in catalyst activity and filter clogging due to catalyst aggregation, simultaneously with improving selectivity for $C_5$ or higher hydrocarbons by using $C_7$-$C_{12}$ alcohols having a high boiling point as an additive for a slurry reaction solvent or recycling the same alcohol separated from by-products that are generated during the F-T reaction. Since the method of the present invention is more carbon-effective and shows improved long-term stability of a reactor, it can be effectively used in the preparation of liquid hydrocarbons.

5 Claims, 2 Drawing Sheets

[Fig. 1]
Catalyst particles formed in Comparative Example 1 after the reaction for 240 hours – there is a severe catalyst aggregation
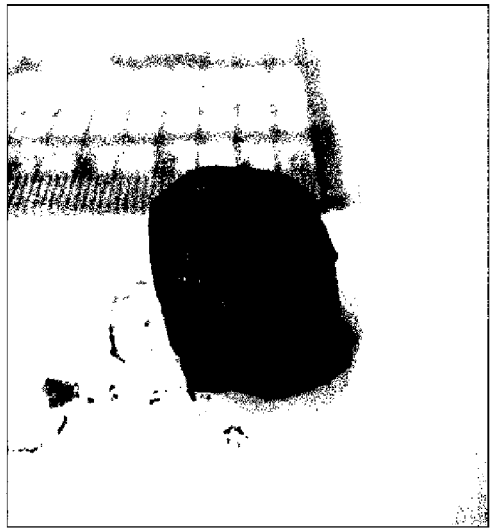
Catalyst particles formed in Example 1 after the reaction for 240 hours – there is no catalyst aggregation
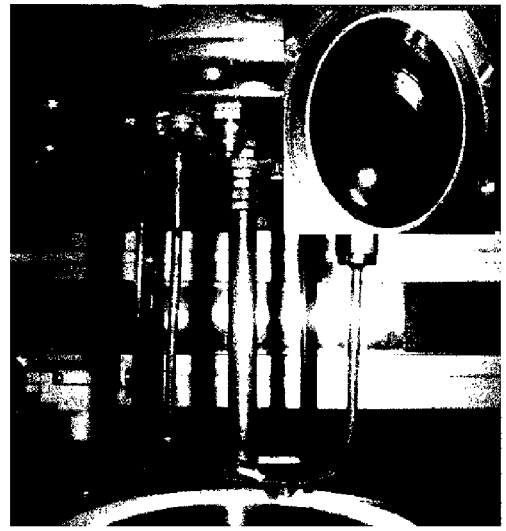
[Fig. 2]
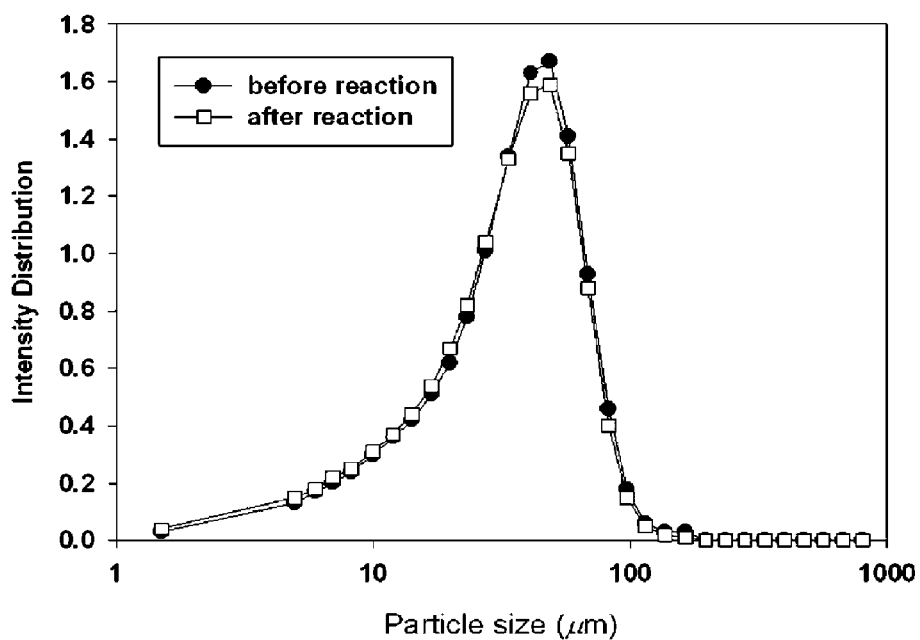

[Fig. 3]
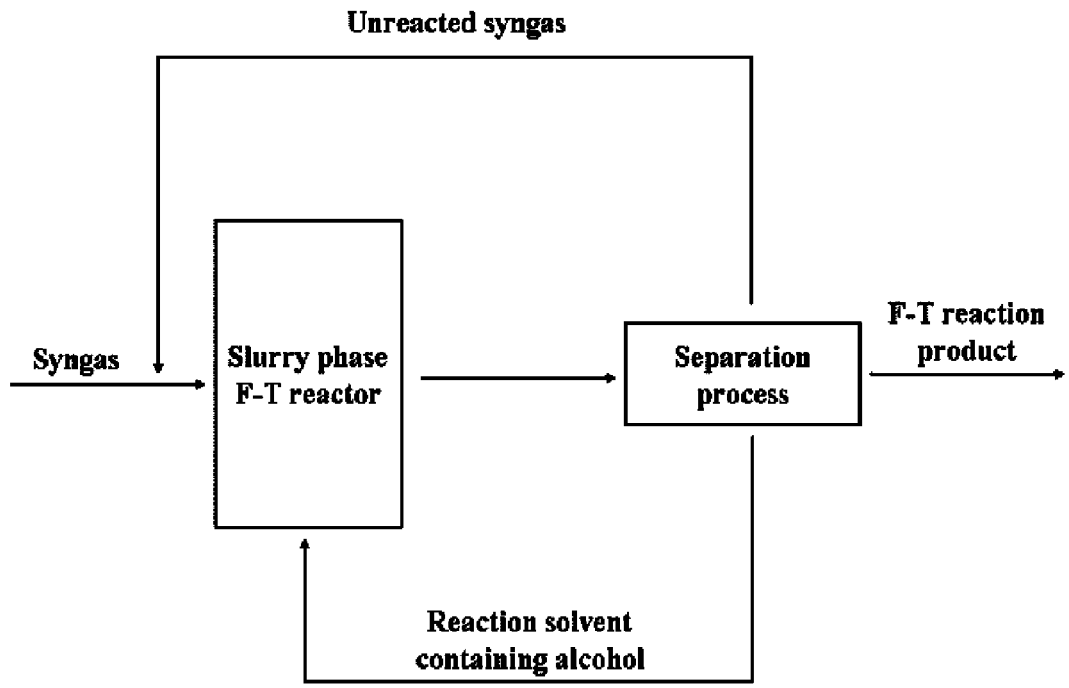
[Fig. 4]
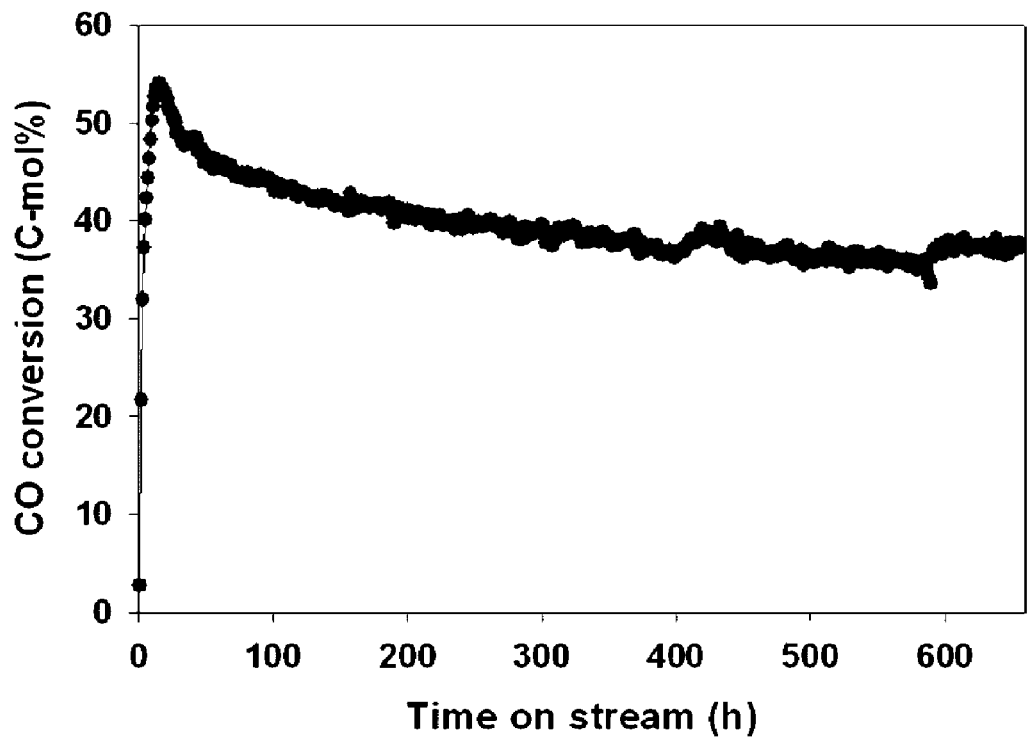

PREPARATION METHODS FOR LIQUID HYDROCARBONS BY FISCHER-TROPSCH SYNTHESIS THROUGH SLURRY REACTION

This application is a 371 of PCT/KR2009/004851 filed on Aug. 28, 2009 published on Apr. 1, 2010 under publication number WO 2010/035961 A which claims priority benefits to Korean Patent Application Number 10-2008-0094225 filed Sep. 25, 2008, the disclosure of which is incorporated herein by reference.

TECHNICAL FIELD

The present invention relates to a method for preparing liquid hydrocarbons via slurry phase Fischer-Tropsch (F-T, hereinafter) synthesis.

BACKGROUND ART

The F-T synthesis, invented by German chemists Fischer and Tropsch in 1923 as the core process in the Gas-To-Liquids (GTL) technology, originates from the preparation of synthetic fuel from syngas by coal gasification. The GTL process consists of the three major steps of (1) reforming of natural gas, (2) F-T synthesis from syngas and (3) reforming of F-T products. The F-T reaction is characterized by performing at a temperature of 200 to 350° C. and a pressure of 10 to 30 atm using iron or a cobalt-based catalyst.

For the F-T reaction, iron- and cobalt-based catalysts have been widely used. The iron-based catalysts were preferred in the past F-T reaction. Recently, however, cobalt-based catalysts are predominant to increase the production of liquid fuel or wax and to improve the conversion rate of carbon monoxide. Iron-based catalysts are characterized in that they are the most inexpensive F-T catalysts producing less methane at high temperature and having high selectivity for olefins, and their products can be utilized as source material in chemical industry as light olefin or -olefin, as well as fuel. In addition, a lot of byproducts, including alcohols, aldehydes, ketones and the like are produced with the concomitant production of hydrocarbons.

Cobalt-based catalysts are more expensive than iron-based catalysts. But, they have higher activity, longer lifetime and higher yield of liquid paraffinic hydrocarbon production with less $CO_2$ formation. However, they can be used only at low temperature because a significant amount of $CH_4$ is produced at high temperature. Further, with the usage of expensive cobalt, the catalysts must be prepared by dispersing on a stable support with a large surface area, such as alumina, silica, titania and the like. Further, there is a need to add a small amount of precious metal components such as Pt, Ru, Re, etc., as promoters.

At present, there are four types of F-T synthesis reactors developed to date: a circulating fluidized bed reactor, a fluidized bed reactor, a multi-tubular fixed bed reactor and a slurry-phase reactor. The reactor should be adequately selected considering the composition of syngas and the kind of a final product, because they have different reaction characteristics depending in the type of a reactor. The F-T reaction conditions are also determined by the kind of final products. Typically, the high-temperature F-T process for producing gasoline and olefin is carried out in the fluidized bed reactor, and the low-temperature F-T process for producing wax and lubricant base oil is carried out in the multi-tubular fixed bed reactor (MTFBR) or in the slurry-phase reactor. Mostly, linear-chain paraffins are produced by the F-T synthesis reaction, but $C_nH_{2n}$ compounds having double bonds, -olefins or alcohols are obtained as byproducts.

The synthesis mechanism of straight-chain hydrocarbons as a main product is mainly explained by the Schulz-Flory polymerization kinetic model. In the F-T process, more than 60% of primary products have a boiling point higher than that of diesel oil. Thus, diesel oil can be further produced by the subsequent hydrocracking process, and the wax component can be transformed into a high-quality lubricant base oil through a dewaxing process.

Furthermore, the slurry reactor for F-T synthesis has several advantages over the fixed bed reactor, as follows:
- it shows high heat transfer efficiency and low pressure drop and temperature gradient along the axial direction of the reactor;
- it is possible to add, discharge and recycle of a catalyst during the operation;
- its production and installation are economically favorable; and
- it yields a higher amount of products per unit reactor volume.

Due to the above advantages, it has been preferred to use the slurry reactor rather than the fixed bed reactor. However, the slurry reactor has the problem of requiring an additional filtration step capable of separating solid catalyst particles and liquid products. Further, there is a problem in that catalyst aggregation caused during the F-T reaction leads to the decrease in reaction efficiency of a slurry reactor and the clogging of a filter used in the above filtration step.

For the prevention of catalyst deactivation through the improvement of catalyst activity and easy transfer of products, there is a method of preparing a silica-alumina catalyst having a bimodal pore structure and improving the stability of the catalyst by increasing the transfer rate of hydrocarbon compounds having a high boiling point produced during the F-T reaction using the same [US 2005/0107479 A1; *Applied Catalysis A* 292 (2005) 252]. The F-T catalyst prepared by the above method show various specific surface areas and a dual porosity structure. However, it has been reported that the F-T reaction activity is closely related with the cobalt particle size, pore size distribution of a support, reduction degree of cobalt and catalyst dispersion in a slurry reactor. Thus, it is better to utilize a method of preventing catalyst aggregation and filter clogging by using by-products such as alcohol produced during the F-T process as a co-solvent in slurry phase reaction in accordance with the present invention than to utilize the above method of using a support prepared by a complicated process. The method according to the present invention can contrive a more efficient F-T process by preventing the decrease in catalyst activity and improving a yield of higher hydrocarbons such as $C_5+$ hydrocarbons.

According to the previous reports to the effect of alcohol added during the F-T reaction, it has been found that $C_2$-$C_3$ alcohols are decomposed during the reaction and convert Co metal components into a cobalt oxidation (CoO) state while decreasing catalyst activity. Simultaneously, ethane produced by the above alcohol decomposition is helpful to the chain growth of hydrocarbons in the F-T reaction, and thereby, enhances the production of hydrocarbons having a low boiling point [*Fuel* 86 (2007) 73-80]. Further, it has been reported that in case of additionally adding 1-olefin to a slurry reactor, it is possible to produce hydrocarbons having a high boiling point due to the enhanced chain growth of hydrocarbons [*Topics in Catalysts*, 2 (1995) 259-266]. However, there is no guarantee that the catalyst aggregation caused by the addition of 1-olefin during the slurry phase reaction can be effectively prevented. In general, it has been regarded that the catalyst aggregation is a phenomenon caused by depositing hydrocarbons having a high boiling point produced during the F-T reaction on the catalyst surface. Thus, in case of producing wax having a high boiling point due to the addition of 1-olefin, it is of advantage to the synthesis of hydrocarbons having a high boiling point, but is not suitable for the prevention of catalyst aggregation. Further, it has been reported that wax generated in the mesopore pore structure of a catalyst during the reaction may decrease the catalyst activity due to low transfer rate by a capillary effect, however, a small amount of alcohol generated during the reaction is helpful to the emulsion formation of water and wax, and the enhanced diffusion of $H_2$ and CO in a condensed water phase of the mesopore can increase the F-T reactivity [*Applied Catalysis A* 161 (1997) 59-78].

In addition, for the facile transfer of wax generated during the F-T reaction in an emulsion state through a pipeline, U.S. Pat. No. 6,284,806 B2 (2001) and U.S. Pat. No. 6,677,388 B2 (2004) disclose a method of preparing F-T wax components in an emulsion state by using a non-ionic surfactant and water generated during the F-T reaction and delivering the same. According to the above patents, in case of using a cobalt-based catalyst, the typical distribution rate of oxygen-containing compounds existed in water generated during the F-T reaction is as follows:

$C_1$-$C_{12}$ alcohols: 0.05-1.5 wt %
$C_2$-$C_6$ acids: 0-50 wppm
$C_2$-$C_6$ ketones, aldehydes, acetals: 0-50 wppm
Other oxygen-containing compounds: 0-500 wppm Of the above described components, alcohols can coexist with water, oils and wax, and the oxygen-containing compounds generated by the F-T reaction are known to be about 2-3 wt. % based on total hydrocarbons production.

DISCLOSURE OF INVENTION

Technical Problem

The present inventors have therefore endeavored to solve the problems during F-T reaction carried out in a slurry reactor which showed the abrupt decrease of catalyst activity due to catalyst aggregation and the clogging of a filter installed within the reactor. As a result, they discovered an improved F-T reaction process of using $C_7$-$C_{12}$ alcohol with a boiling point of 150° C. or higher under atmospheric pressure as an additive for a slurry reaction solvent or recycling the above alcohol separated from by-products that are generated during the F-T reaction. The improved F-T reaction process according to the present invention can prevent the decrease of catalyst activity and clogging of filters inside the reactor due to catalyst aggregation, and simultaneously, improve selectivity for $C_5$ or higher hydrocarbons. As a result, the F-T process according to the present invention becomes more carbon-effective and shows improved long-term stability of a catalyst.

Therefore, the objective of the present invention is to provide a method for preparing liquid hydrocarbons via slurry phase F-T synthesis, which can prevent the decrease in catalyst activity and filter clogging inside the reactor due to catalyst aggregation, while improving selectivity for $C_5$ or higher hydrocarbons.

Solution to Problem

The present invention provides a method for preparing liquid hydrocarbons from syngas via slurry phase F-T synthesis using a catalyst, which is characterized in that the slurry phase F-T synthesis is carried out in the presence of $C_7$-$C_{12}$ alcohol having a high boiling point.

Advantageous Effects of Invention

For the improvement of a GTL technology that has been in the spotlight as an alternative for coping with the rapidly changing oil price increase, it is necessary to develop a more stable GTL process by preventing catalyst aggregation within a slurry reactor so as to prolong the operation time of the reactor, with improving a catalyst for a F-T synthesis reaction. In particular, depending on the improvement of a catalyst for the F-T reaction and a slurry reaction process, it is capable of enhancing heat and carbon efficiencies of the GTL process and contriving an optimized F-T reaction process. Since the method of the present invention can prevent the decrease in catalyst activity and filter clogging due to catalyst aggregation, simultaneously with improving selectivity for $C_5$ or higher hydrocarbons by using $C_7$-$C_{12}$ alcohols having a high boiling point as an additive for a slurry reaction solvent in a slurry reactor for a F-T reaction, it is possible to constitute a more efficient F-T process, and thereby, develop a more competitive GTL process.

BRIEF DESCRIPTION OF DRAWINGS

FIG. 1 is photographs confirming whether catalyst aggregation occurred in a slurry reactor 240 hours after the F-T reaction according to Comparative Example 1 and Example 1, respectively.

FIG. 2 is a graph showing the particle size distribution of a catalyst used in Example 1 before and after the reaction, which confirms that catalyst aggregation does not occur after the F-T reaction.

FIG. 3 is a diagram schematically illustrating a slurry phase F-T synthesis reaction by using $C_7$-$C_{12}$ alcohols having a high boiling point which are separated from by-products during the F-T reaction and recycled into a slurry reactor, in which after the by-products are undergone a separation step, carbon monoxide and hydrogen as unreacted gas are delivered to a reactant, and $C_7$-$C_{12}$ alcohols having a high boiling point is recycled as an additive for a slurry reaction solvent, wherein the $C_7$-$C_{12}$ alcohols having a high boiling point in an abundant flow is maintained in a concentration of 5,000 to 50,000 ppm.

FIG. 4 shows the results of examining long-term stability of a catalyst used in Example 6, which confirms that the level of catalyst deactivation is low during the reaction period of over 400 hours and catalyst aggregation is efficiently prevented.

BEST MODE FOR CARRYING OUT THE INVENTION

The present invention relates to a method for preparing liquid hydrocarbons from syngas via a slurry phase Fischer-Tropsch (F-T) synthesis using a cobalt-based catalyst, which is characterized in that it can prevent the decrease in catalyst activity and filter clogging due to catalyst aggregation, simultaneously with improving selectivity for $C_5$ or higher hydrocarbons by using $C_7$-$C_{12}$ alcohols having a high boiling point as an additive for a slurry reaction solvent or recycling the same alcohol separated from by-products that are generated during the F-T reaction.

Typically, in order to disperse expensive active components significantly in the F-T reaction in which liquid hydrocarbons are produced from syngas, cobalt or other promoting substance is introduced to a support having a large surface area, such as alumina, silica, titania and the like to prepare a catalyst. For the effective prevention of catalyst deactivation through the increase in F-T catalyst activity and easy transfer of a F-T product, it has been reported a method of increasing a transfer rate of a compound having a high boiling point generated during the F-T reaction and enhancing long-term stability of a catalyst by preparing a silica-alumina based catalyst having a bimodal pore structure. The F-T catalysts prepared by the method show various specific surface areas and a bimodal pore structure. Considering the activity of the F-T reaction is known to be closely related with the cobalt particle size and degree of reduction of the cobalt component, pore size distribution of the support and catalyst aggregation in a slurry reactor, it is better to utilize a method of using by-products such as alcohol produced during the F-T process as a slurry phase reaction co-solvent in accordance with the present invention, rather than to utilize the method of using the bimodal-structured catalyst prepared by such a complicated process. Since the method according to the present invention can prevent the catalysts from aggregation and filters inside the reactor from clogging, it is possible to contrive a more efficient F-T reaction process in terms of carbon utilization.

According to the prior art to the effect of $C_2$-$C_3$ alcohols added during the F-T reaction, it has been reported that alcohols are decomposed during the reaction, convert Co metal components into a cobalt oxidation (CoO) state, and thereby, induce the decrease in catalyst activity. Simultaneously, ethane produced by the alcohol decomposition is helpful to the chain growth of hydrocarbons in the F-T reaction, leading to the increase in production of hydrocarbons having a low boiling point. Further, it has been reported that in case of additionally adding 1-olefin to a slurry reactor, it is possible to produce wax having a high boiling point due to the promoted chain growth of hydrocarbons. It has been also reported that wax generated during the F-T reaction causes the blockage of mesopore of a catalyst due to capillary effect may cause the falling-off in catalyst activity. However, a small amount of alcohol generated during the reaction is helpful to the emulsion formation of water and wax, and the enhanced diffusion of $H_2$ and CO in a condensed water phase of the mesopore can increase the F-T reactivity.

The F-T catalysts used in the slurry reactor according to the present invention include Co/$Al_2O_3$ as a commercially available catalyst for a slurry phase reaction, catalysts on which Pt, Ru or Rh is supported as a promoting agent, F-T cobalt catalysts having a dual pore structure (Korean Patent Nos. 0830719 and 0837377) and catalysts whose alumina surface is modified with phosphorous (Korean Patent Application Nos. 2007-0075065, 2007-0089635 and 2008-0028518). Among these catalysts, it is preferable to use the F-T catalyst having a bimodal pore structure for improving the intended effect of alcohol addition in the present invention.

Further, the slurry reactor suitable for the present invention may be exemplified by a commercially available slurry reactor known in the art and a slurry reactor used for a highly efficient continuous separation process of a catalyst and wax (Korean Patent Application No. 2008-0018679).

Since the present invention uses $C_7$-$C_{12}$ alcohols having a boiling point of 150° C. or higher under atmospheric pressure as an additive for a slurry reaction co-solvent, it is possible to prevent the decrease in catalyst activity and clogging of filters inside the reactor due to catalyst aggregation, and at the same time, improve selectivity for $C_5$ or higher hydrocarbons. Further, the present invention recycles the above mentioned alcohols having a high boiling point separated from by-products that are generated during the F-T reaction, which is economically more favored.

However, in case of using $C_1$-$C_6$ alcohols, the rate of reoxidizing a cobalt-based catalyst for the F-T reaction is increased, thereby inducing a decrease in catalyst activity. Thus, it is more effective to use $C_7$-$C_{12}$ alcohols capable of coexisting with a reaction solvent at a slurry reaction temperature of 200 to 250° C. Since the use of $C_7$-$C_{12}$ alcohols is very helpful to form an emulsion of water and wax, it can be expected to significantly reduce catalyst aggregation and filter clogging within the reactor. Further, the reoxidation rate of a cobalt-based catalyst due to the alcohol decomposition is remarkably decreased, and thereby, the effect of cobalt reoxidation on catalyst deactivation is insignificant. In addition, the chain growth of hydrocarbons is enhanced by ethane produced by the alcohol decomposition, leading to the increase in the production of C5 or higher hydrocarbons.

The $C_7$-$C_{12}$ hydrocarbons having a high boiling point suitable for the present invention may include heptanol, octanol, decanol, dodecanol, etc., and it is preferable that their concentration be maintained at 5,000-50,000 ppm to maximize the intended effect of the present invention. If the concentration of the hydrocarbons is lower than 5,000 ppm based on a slurry reaction co-solvent, the effect of improving the function of a slurry reactor through the alcohol addition becomes insignificant. On the other hand, if it exceeds 50,000 ppm, there occurs a problem that excessive alcohol decreases the F-T reaction activity. Thus, it is necessary to maintain the concentration of the $C_7$-$C_{12}$ hydrocarbon having a high boiling point at the range as mentioned above.

Further, the present invention can prepare liquid hydrocarbons by operating the F-T slurry reactor using the $C_7$-$C_{12}$ hydrocarbon having a high boiling point in accordance with the present invention. There is no limitation on reaction conditions for the F-T reaction so long as they are generally used in the art. For instance, the F-T reaction catalyst is subjected to reduction in an F-T slurry reactor at a temperature of 200 to 600° C. under hydrogen atmosphere before the F-T reaction. Thus reduced F-T reaction catalyst can be employed in the F-T reaction under the conditions conventionally used in the art, preferably at a temperature of 200 to 300° C., a pressure of 5 to 30 kg/cm$^3$ and a space velocity of 500 to 10,000 h$^{-1}$, but are not limited thereto.

Hereinafter, the present invention is described in detail through examples. However, the following examples do not limit the present invention.

Preparation Example 1

Preparation of a Catalyst for a Slurry Reaction

First, porous alumina (SASOL, CATAPAL B) used as a support was calcined at 500° C. for 4 hours so as to remove impurities and water within pores, to thereby obtain γ-$Al_2O_3$.

Thus prepared powdery alumina support (10 g) and cobalt nitrate ($Co(NO_3)_2 \cdot 6H_2O$) (10.2 g) as a cobalt precursor were dissolved and mixed in 200 mL of distilled water, followed by stirring at room temperature for 12 hours. After that, the resulting mixture was dried at 105° C. for over 12 hours, to prepare a powdery cobalt/alumina catalyst. Here, the content of the catalyst was 16.7 wt % Co/γ-$Al_2O_3$ based on the total amount of catalyst, its specific surface area was 146 m$^2$/g, its average pore volume was 0.33 cm$^3$/g, and its average pore size was 6.7 nm.

Example 1

Slurry Phase Reaction in a Reaction Solvent with the Coexistence of Alcohol The catalyst prepared in Preparation Example 1 was reduced with hydrogen at 400° C. for 12 hours and introduced to a slurry reactor without air-exposure.

300 mL of squalane was added to the slurry reactor as a reaction solvent. After adding 5 g of the catalyst, another reduction was performed at 220° C. for over 12 hours. 1-heptanol was added to the slurry reaction solvent in a concentration of 20,000 ppm as an additive so as to prevent the occurrence of catalyst aggregation. The reactants carbon monoxide, hydrogen, carbon dioxide and argon (internal standard) were supplied to the reactor at a fixed molar ratio of 28.4:57.3:9.3:5, and the F-T reaction was carried out under the conditions of: reaction temperature=220-240° C.; reaction pressure=20 kg/cm$^2$; space velocity=2,000 L/kgcat/hr; and stirring rate=2,000 rpm. The F-T reaction was carried out at 220° C. for 120 hours, followed by 240° C. for additional 120 hours. Thus, the occurrence of catalyst aggregation was monitored for a total of 240 hours. The contents of the product of the F-T reaction are summarized in Table 1. Here, the averaged values for 10 hours at the steady-state where the catalyst activity was stabilized were taken.

Example 2

The F-T reaction was carried out according to the same method as described in Example 1 except that 1-octanol was added to the slurry reaction solvent in a concentration of 10,000 ppm as an additive. The results are summarized in Table 1 by calculating the averaged values for 10 hours at the steady-state where the catalyst activity was stabilized.

Example 3

The F-T reaction was carried out according to the same method as described in Example 1 except that 1-octanol was added to the slurry reaction solvent in a concentration of 20,000 ppm as an additive. The results obtained under the same reaction conditions as described in Example 1 are summarized in Table 1 by calculating the averaged values for 10 hours at the steady-state where the catalyst activity was stabilized.

Example 4

The F-T reaction was carried out according to the same method as described in Example 1 except that 1-octanol was added to the slurry reaction solvent in a concentration of 40,000 ppm as an additive. The results are summarized in Table 1 by calculating the averaged values for 10 hours at the steady-state where the catalyst activity was stabilized.

Example 5

The F-T reaction was carried out same as in Example 1 except that decanol was added to the slurry reaction solvent in a concentration of 20,000 ppm as an additive, and the occurrence of catalyst clustering was monitored after the reaction at 220° C. for 120 hours. The results are summarized in Table 1 by calculating the averaged values for 10 hours at the steady-state where the catalyst activity was stabilized.

Example 6

An F-T catalyst was prepared carried out same as in Korean Patent Application No. 2007-0075065, and the F-T reaction was carried out by using the F-T catalyst in a slurry reactor where 1-heptanol was added to the slurry reaction solvent in a concentration of 20,000 ppm as an additive.

In particular, in order to prepare alumina with a large surface area via a sol-gel process, aluminum isopropoxide was mixed in 2-propanol to prepare a slurry. Acetic acid and water were then added to the slurry, followed by hydrolysis, thereby generating amorphous aluminum hydroxide. Here, the slurry was prepared by using the reactants aluminum isopropoxide:2-propanol:acetic acid:water at a mixed molar ratio of 1:25:0.1:3. Thus prepared slurry was aged while refluxing with 2-propanol at 90° C., 1 atm for 20 hours and dried in an oven at 100° C., to thereby obtain boehmite powder. Thus obtained boehmite powder were calcined at 500° C. for 5 hours to prepare alumina with a large surface area (specific surface are =455 m$^2$/g). Thus prepared alumina was soaked in a phosphoric acid solution in which 0.744 g of phosphoric acid ($H_3PO_4$) based on 10 g of the alumina was dissolved in 60 mL of water, thereby preparing alumina supported with phosphate. Then, the alumina was calcined at 500° C. for 5 hours, to prepare a powdery phosphorous-pretreated alumina support. Here, thus prepared phosphorous-pretreated alumina support had a specific surface area of 400 m$^2$/g. 3.055 g of the cobalt nitrate ($Co(NO_3)_2 \cdot 6H_2O$) as a cobalt precursor was dissolved in 60 mL of distilled water with 3 g of the powder phosphorous-pretreated alumina support, followed by stirring at room temperature for 12 hours. After that, the resulting mixture was dried at 100° C. for over 12 hours, followed by calcination at 400° C. for 5 hours under air atmosphere, to prepare a cobalt/phosphorous-pretreated alumina catalyst. Here, the content of the catalyst was 16.7 wt % Co/2.0 wt % P/γ-$AL_2O_3$ based on the total amount of catalyst, and its specific surface area was 168 m$^2$/g.

The results obtained under the same reaction conditions as described in Example 1 except that the reaction temperature was 230° C. are summarized in Table 1 by calculating the averaged values for 10 hours at the steady-state where the catalyst activity was stabilized.

Comparative Example 1

The F-T reaction was carried out by using the same catalyst and reaction conditions as described in Example 1. Here, the catalyst was reduced with hydrogen at 400° C. for 12 hours and introduced to a slurry reactor after sealing.

300 mL of squalane was added to the slurry reactor as a reaction solvent. After adding 5 g of the catalyst, another reduction was performed at 220° C. for over 12 hours. The F-T reaction was carried out without the addition of an additive to the slurry reaction solvent for preventing catalyst clustering. The reactants carbon monoxide, hydrogen, carbon dioxide and argon (internal standard) were supplied to the reactor at a fixed molar ratio of 28.4:57.3:9.3:5, and the F-T reaction was carried out under the conditions of: reaction temperature=220-240° C.; reaction pressure=20 kg/cm$^2$; space velocity=2,000 L/kgcat/hr; and stirring rate=2,000 rpm. The contents of the product of the F-T reaction are summarized in Table 1. Here, the averaged values for 10 hours at the steady-state where the catalyst activity was stabilized were taken.

Comparative Example 2

The F-T reaction was carried out using the same method as in Example 1 except that 1-octanol was added to the slurry reaction solvent in a concentration of 4,500 ppm as an additive. The results obtained under the same reaction conditions as described in Example 1 are summarized in Table 1 by calculating the averaged values for 10 hours at the steady-state where the catalyst activity was stabilized.

Comparative Example 3

The F-T reaction was carried out using the same method as in Example 1 except that 1-octanol was added to the slurry reaction solvent in a concentration of 80,000 ppm as an additive. The results are summarized in Table 1 by calculating the averaged values for 10 hours at the steady-state where the catalyst activity was stabilized.

Comparative Example 4

The F-T reaction was carried out using the same method as in Example 1 except that 1-octane which is one of high-boiling point olefin was added to the slurry reaction solvent in a concentration of 20,000 ppm as an additive. The results are summarized in Table 1 by calculating the averaged values for 10 hours at the steady-state where the catalyst activity was stabilized.

TABLE 1

| | Additives (ppm) | Reaction temperature (° C.) | CO conversion (C-mol %) | Product distribution $C_1/C_2\text{-}C_4/C_5$ or (C-mol %) | Yield of $C_5$ or higher (%) | Presence of Catalyst aggregation $^a$ |
|---|---|---|---|---|---|---|
| Ex. 1 | 1-Heptanol (20,000) | 220 | 31.4 | 1.4/2.0/96.6 | 30.3 | Absent |
| | | 240 | 63.7 | 3.4/4.5/92.1 | 58.7 | |
| Ex. 2 | 1-Octanol (10,000) | 220 | 37.0 | 0.7/0.9/98.4 | 36.4 | Absent |
| | | 240 | 57.6 | 2.8/3.0/94.2 | 54.3 | |
| Ex. 3 | 1-Octanol (20,000) | 220 | 38.8 | 0.8/0.9/98.3 | 38.1 | Absent |
| | | 240 | 52.9 | 1.2/1.6/97.2 | 51.4 | |
| Ex. 4 | 1-Octanol (40,000) | 220 | 44.0 | 1.2/1.5/97.3 | 42.8 | Absent |
| Ex. 5 | Decanol (20,000) | 220 | 35.2 | 0.7/1.5/97.8 | 34.4 | Absent |
| | | 240 | 51.5 | 1.3/2.6/96.1 | 49.5 | |
| Ex. 6 | 1-Heptanol (20,000) | 230 | 38.7 | 0.8/1.0/98.2 | 38.0 | Absent |
| Comp. Ex. 1 | — | 220 | 31.9 | 4.3/5.8/89.9 | 28.7 | Present |
| | | 240 | 61.3 | 7.5/10.2/82.3 | 50.4 | |
| Comp. Ex. 2 | 1-Octanol (4,500) | 220 | 38.1 | 1.1/1.5/97.4 | 37.1 | Present |
| | | 240 | 60.1 | 2.2/2.6/95.2 | 57.2 | |
| Comp. Ex. 3 | 1-Octanol (80,000) | 220 | 39.4 | 0.7/1.0/98.3 | 38.7 | Present |
| | | 240 | 65.5 | 2.9/4.1/93.0 | 60.9 | |
| Comp. Ex. 4 | 1-Octene (2,0000) | 220 | 14.6 | 0.6/1.1/98.3 | 14.4 | Present |
| | | 240 | 38.8 | 1.2/1.5/97.3 | 37.8 | |

$^a$ Catalyst aggregation was verified when the size of catalyst aggregates is lager than 2 × 2 cm.

As illustrated in Table 1, it has been found from the results of Examples 1 to 5 that when the $C_2$-$C_7$ alcohols having a boiling point of 150° C. or higher under atmospheric pressure was added to the slurry phase F-T reaction in a concentration of 5,000-50,000 ppm as an additive for the slurry reaction solvent in accordance with the present invention, the decrease in catalyst activity and filter clogging inside the reactor due to catalyst aggregation are efficiently prevented, and simultaneously, selectivity for $C_5$ or higher hydrocarbons is improved, which makes possible to contrive a more carbon-effective F-T reaction process. Further, as a result of performing the F-T reaction by using Co/γ-$Al_2O_3$ catalyst known as a commercial F-T catalyst component in accordance with Comparative Example 1, severe catalyst aggregation was observed 240 hours after the reaction. In case of Comparative Examples 2 and 3, where the $C_2$-$C_7$ alcohols having a high boiling point according to the present invention were added to the slurry reaction solvent in a concentration beyond the preferred range, catalyst clustering was observed after the reaction, indicating that it is preferable to maintain the concentration of the $C_2$-$C_7$ alcohols having a high boiling point to the range of 5,000 to 50,000 ppm to achieve the intended effect of the present invention. Further, it has been found that when 1-octane, one of high-boiling point olefin, was used as an additive, this is favorable to produce hydrocarbons having a high boiling point via the F-T reaction, but is not effective for preventing the occurrence of catalyst aggregation.

It will be apparent to those skilled in the art that various modifications and variations can be made in the present invention without departing from the spirit or scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for preparing liquid hydrocarbons from syngas via slurry phase Fischer-Tropsch synthesis using a catalyst, wherein said slurry phase Fischer-Tropsch synthesis is carried out in the presence of a $C_7$-$C_{12}$ alcohol having a high boiling point.

2. The method according to claim 1, wherein the alcohol having a high boiling point is separated from a by-product generated during the slurry phase Fischer-Tropsch synthesis reaction and then recycled.

3. The method according to claim 1, wherein the alcohol having a high boiling point has a boiling point of 150° C. or higher under atmospheric pressure at a concentration of 5,000 to 50,000 ppm.

4. The method according to claim 1, wherein the catalyst is a cobalt-based catalyst having a specific surface area of 50 to 500 $m^2$/g in which the content of cobalt is in the range of from 5 to 40 wt %.

5. The method according to claim 2, wherein the alcohol having a high boiling point has a boiling point of 150° C. or higher under atmospheric pressure at a concentration of 5,000 to 50,000 ppm.

* * * * *